(12) United States Patent
Tsai (10) Patent No.: US 8,465,684 B1
(45) Date of Patent: Jun. 18, 2013

(54) SELF-REINFORCED COMPOSITE MADE OF RECYCLED MATERIALS AND PROCESS OF MAKING THE SAME

(75) Inventor: Fu-Jya Daniel Tsai, Alpharetta, GA (US)

(73) Assignee: Novana, Inc., Alpharetta, GA (US)

( * ) Notice: Subject to any disclaimer, the term of this patent is extended or adjusted under 35 U.S.C. 154(b) by 248 days.

(21) Appl. No.: 12/983,373

(22) Filed: Jan. 3, 2011

Related U.S. Application Data (62) Division of application No. 11/986,757, filed on Nov. 26, 2007, now Pat. No. 7,887,726.

(51) Int. Cl.
*D01D 5/26* (2006.01)

(52) U.S. Cl.
USPC ........... 264/143; 264/148; 425/113; 525/178; 525/179; 525/184

(58) Field of Classification Search
USPC ................... 264/143, 148; 425/113; 525/178, 525/179, 184
See application file for complete search history.

(56) References Cited

U.S. PATENT DOCUMENTS

| | | | |
|---|---|---|---|
| 4,451,528 A * | 5/1984 | Krause | 428/300.4 |
| 5,002,712 A * | 3/1991 | Goldmann et al. | 264/171.13 |
| 5,169,870 A | 12/1992 | Corbin et al. | |
| 5,225,489 A | 7/1993 | Prevorsek et al. | |
| 5,294,384 A * | 3/1994 | David et al. | 264/143 |
| 5,532,404 A | 7/1996 | Gallagher | |
| 5,591,802 A | 1/1997 | David et al. | |
| 5,626,939 A | 5/1997 | Kotlair et al. | |
| 5,719,198 A | 2/1998 | Young et al. | |
| 5,849,804 A | 12/1998 | Sarian et al. | |
| 6,155,020 A | 12/2000 | Deem | |
| 6,211,275 B1 | 4/2001 | Xanthos et al. | |
| 6,211,294 B1 * | 4/2001 | Tsai et al. | 525/178 |
| 6,271,270 B1 | 8/2001 | Muzzy et al. | |
| 6,475,418 B1 * | 11/2002 | Tsai et al. | 264/143 |
| 6,756,412 B2 | 6/2004 | Muzzy | |
| 7,067,613 B2 | 6/2006 | Mauldin et al. | |
| 7,173,127 B2 | 2/2007 | Born et al. | |

OTHER PUBLICATIONS

E. Coyer, "Closing the carpet loop", Textile World, pp. 20-22, Apr. 2005.

* cited by examiner

*Primary Examiner* — Peter D. Mulcahy
*Assistant Examiner* — Henry Hu (57) ABSTRACT

The invention is directed to a "Self-Reinforced Composite" (SRC) made of recycled thermoplastic polymers, methods and an apparatus for their manufacture. In one embodiment of the invention, the SRC is a self-reinforced composite comprising (a) a fiber comprising a first recycled thermoplastic polymer and having a Young's modulus at least about 500 MPa and (b) a matrix comprising a second recycled thermoplastic polymer. In one aspect of the invention, the source mixture is recycled immiscible thermoplastic polymers, obtained from the waste stream in the carpet and automotive industries. In another embodiment of the invention, the method for making the self-reinforced composites, comprising the steps of (a) melt-blending recycled immiscible polymers, (b) phase-migration fiber spinning the recycled immiscible polymers to form a fiber having a first recycled thermoplastic polymer substantially surrounded by a second recycled thermoplastic polymer, and (c) drawing the fiber to form a high modulus fiber.

17 Claims, 4 Drawing Sheets

SELF-REINFORCED COMPOSITE MADE OF RECYCLED MATERIALS AND PROCESS OF MAKING THE SAME

This application is a division of U.S. patent application Ser. No. 11/986,757 filed Nov. 26, 2007, which based on and claims the benefits of U.S. Provisional Application Ser. No. 60/860,967, filed Nov. 24, 2006.

CROSS-REFERENCE TO RELATED APPLICATIONS

This application is based on and claims the benefits of U.S. Provisional Application Ser. No. 60/860,967, filed Nov. 24, 2006.

BACKGROUND OF THE INVENTION

1. Field of Invention

The present invention generally relates to self-reinforced composites and methods for their manufacture and, in particular, to self-reinforced composites which incorporate recycled thermoplastics.

2. Background of the Invention

Environmental and societal urgency to reduce landfill waste from the carpet and automotive industries is emerging. According to the Environmental Protection Agency, the municipal solid waste generated in the USA is over 245 million tons per year, where about 13% are synthetic polymers, including plastics, rubbers, and carpet and textiles. Most synthetic polymer wastes are derived from immiscible multiple polymer systems and are thus difficult to recycle. At present, only about 6% plastics, 19% rubber, and 1% carpet is recovered for recycling. The remaining is either landfilled or incinerated for energy recovery. Among these figures, over 5 billion pounds of carpet were discarded and landfilled in the USA in 2006.

Being the main method in solid waste handling, landfilling appears to be a rather ineffective method, particularly for synthetic polymer wastes. Unlike natural polymers, such as cellulose in cotton, synthetic polymers, e.g., nylon, polypropylene (PP), polyesters, and others, are difficult to degrade after landfill, thus polluting the land for many years. Further, since these polymers are derived from petroleum, a limited natural resource, continuous landfilling rather than recycling would ultimately deplete the world storage. It is therefore highly desired to reclaim polymers from the waste and to reuse them in new products.

Most polymer-based products are composed of more than one polymer. For example, over 80% carpet is made of nylon face fibers and PP backings. Multiple polymers are also widely used in automotive components. A car bumper is commonly made of a primary structure (e.g. nylon) and a secondary impact absorbing material (e.g. PP foams). The soft touching material used in seating and roofing typically comprises a polycarbonate film coated with a soft polyurethane layer and backed by a polyurethane foam or a foam made of a third polymer. Considering the large number of different grades of polymers used in end products and the complexity in identifying and sorting them, polymer recycling is difficult. The process becomes further complicated because most polymers are immiscible or incompatible at the molecular level. The nature of immiscibility greatly limits the use of them, mainly due to their poor mechanical properties. For example, nylon and PP, commonly used in carpet and automotive applications, are highly immiscible because of their different polarity. For these reasons, most efforts in polymer recycling have been focused on developing methods for separating and identifying different polymers from the waste.

While many recycling centers currently in operation still largely rely on labor-intensive manual sorting, the industry has introduced a number of techniques, including near-infrared spectroscopy, artificial intelligence, triboelectric separation, sink-float procedures, and the use of powder hydrocyclones for identification. These methods have proven to be valuable in sorting discrete waste articles, e.g. plastic bottles. However, they are difficult to implement in separating polymer wastes involving immiscible polymers. The reason becomes evident considering the fact that different polymers in the immiscible polymers waste are typically interlocked or bonded intimately. Carpets and automotive-used soft touching materials, as mentioned above, are among such products. To prepare for sorting, one needs to shred the immiscible polymer waste into particles fine enough to mechanically disintegrate the different polymers. This is not only highly energy consuming, but also difficult or even impossible to practice in many cases.

An alternative method [U.S. Pat. Nos. 7,067,613; 5,849,804] for separating immiscible polymers is solvent extraction. Such a method involving potentially hazardous solvent handling is hard to implement in large scale.

Some previous attempts [U.S. Pat. Nos. 7,173,127; 5,532,404; 5,169,870] have been made by depolymerizing the face fiber of the post consumer carpet waste into a monomer. In the case of nylon, it can be depolymerized by hydrolysis or ammonolysis. Following purification, the monomers may be re-polymerized to form new polymers having similar performance characteristics to those of virgin polymers. The design and setup of these chemical processes, however, need to be customized based on the source and composition of waste and are thus expensive to implement. According to a recent reviewing report in nylon recycling, depolymerization-based recycling business for nylon carpet almost vanished by the end of 2004.

Other processes focus on recycling immiscible polymer wastes by melt blending. The success of this method, however, is greatly hampered by the immiscible nature of polymers, resulting in end-products having very poor mechanical properties. Some processes [U.S. Pat. Nos. 5,591,802; 5,294,384] teach to improve the mechanical properties of the end products by the addition of compatibilizers during melt blending. One drawback of the compatibilization method is the high cost of the compatibilizer. Further, for different wastes with different polymers involved, different compatibilizers are needed. Even with compatibilizers, the mechanical performance of the PP/nylon blend reported so far is still poor. In addition to adding the compatibilizers, other processes [U.S. Pat. Nos. 6,756,412, 6,271,270] focus on adding high modulus fiber such as glass fiber and a fiber adhesion promoter to reinforce the recycled composite containing nylon and PP. These methods involve an addition of a high cost foreign reinforced material such as glass fiber in a separated step to improve mechanical properties. Also, the addition of the foreign reinforced fiber further increases the weight of the composite which is undesirable in most of the applications.

All of these prior attempts for recycling of thermoplastic waste consisting of immiscible polymers suffers from shortcomings, thus an unmet need exists for an environmentally benign, inexpensive, and practical method of recycling immiscible polymers.

SUMMARY

The present invention is generally directed to a "Self-Reinforced Composite" (SRC) made of recycled thermoplastic polymers, methods and an apparatus for their manufacture.

In one embodiment of the present invention, the SRC is a thermoplastic composite comprising (a) a high modulus fiber comprising a first recycled thermoplastic polymer and having a Young's modulus at least about 500 MPa, and (b) a matrix comprising a second recycled thermoplastic polymer. In one particular aspect of the present invention, the source mixture, recycled immiscible thermoplastic polymers can be obtained from the waste stream in the carpet, automotive and other-related industries. The first recycled thermoplastic polymer can be selected from the group consisting of nylon 6, nylon 6,6, nylon 6,10, PET, polyurethane, polycarbonates, and their derivates. The second recycled thermoplastic polymer can be selected from the group consisting of polypropylene, polyethylene, polyolefin, and their derivatives. The self-reinforced composite can be derived from a precursor fiber wherein the high modulus fiber is substantially surrounded by the second recycled thermoplastic polymer using the phase-migration fiber spinning process. Alternatively, the self-reinforced composite comprises the fiber having a tensile strength at break greater than about 150 MPa.

In another embodiment of the present invention, a method for making the self-reinforced composites, comprises the steps of: (a) melt-blending recycled immiscible polymers, (b) phase-migration fiber spinning the recycled immiscible polymers to form a precursor fiber having a first recycled thermoplastic polymer substantially surrounded by a second recycled thermoplastic polymer, and (c) drawing the precursor fiber to form a high modulus fiber. Alternatively, the precursor fiber can be converted into a shaped article comprising a fiber comprising the first recycled thermoplastic polymer and a matrix comprising the second recycled thermoplastic polymer using a thermoforming process.

In another embodiment of the present invention, an apparatus for providing formation of the phase-migration fiber spinning comprises (a) an extruder adapted to provide a stream of extrudate, (b) a melt filter for filtering particles larger than a desired size from the extrudate stream, and (c) a spinneret comprising at least one extended capillary tube having a length to diameter (L/D) ratio greater than about 20. This apparatus facilitates the phase migration in a tubular flow to form a precursor fiber comprising a first recycled thermoplastic polymer substantially surrounded by a second recycled thermoplastic polymer.

The resulting SRC offers benefits including good mechanical properties, light weight, and three-dimension processing conformability. This invention is to provide a practical solution to resolve the emerging recycling issue of landfill waste stream from the carpet and automotive industries. This invention not only eliminates the step of separation of immiscible polymers from waste stream, but also provides a viable solution to increase the value of recycled plastics. In contrast to the existing practices, this invention provides a practical and yet lower cost method to make the recycled thermoplastics into value-added composites.

DETAILED DESCRIPTION OF THE PREFERRED EMBODIMENT

Figure 1:
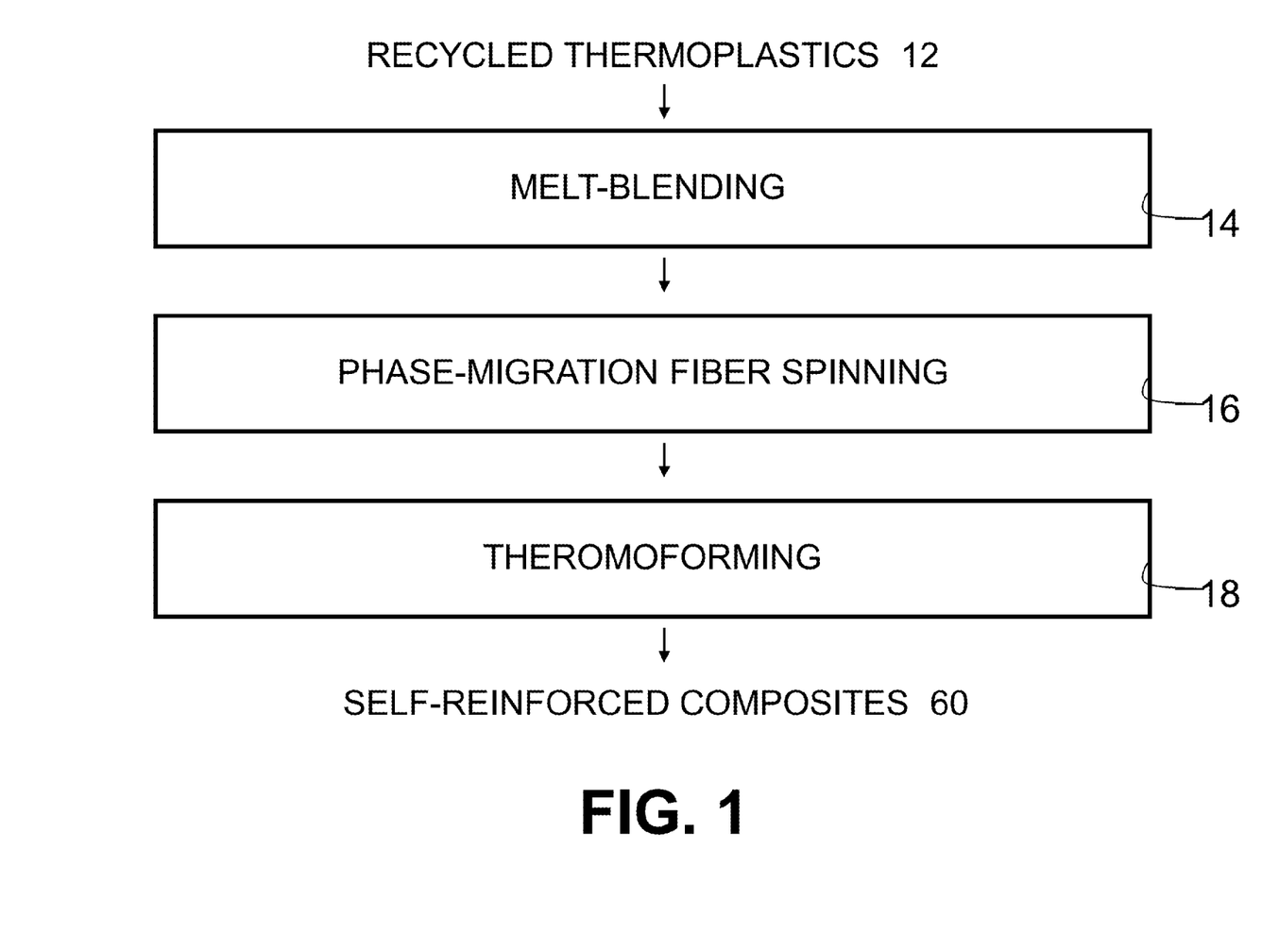
FIG. 1 is a high level block diagram illustrating an exemplary method of manufacturing a recycled self-reinforced composite in accordance with one aspect of the prevent invention.

Reference will now be made in detail to the description of the invention as illustrated in the drawings, wherein like reference numbers indicate like parts throughout several views. With reference to FIG. 1, an exemplary method for making a self-reinforced composite (SRC) 60 from recycled thermoplastics 12 in accordance with one embodiment of the present invention includes the steps of: melt-blending of the recycled thermoplastics (step 14), and phase-migration fiber spinning to form a precursor fiber (step 16), and thermoforming of the precursor fibers by melting the polymer substantially exposed on the surface into a matrix (step 18).

The SRC 60 (FIGS. 1, 2 and 5) is a thermoplastic composite comprising an "in-situ process-induced" high modulus fiber comprising a first recycled thermoplastic polymer and a matrix comprising a second recycled thermoplastic polymer. The first polymer has a higher melting temperature than that of the second polymer. The "in-situ process-induced" high modulus fiber is defined as a high modulus fiber made of at least one of the recycled thermoplastics 12, and produced during the phase migration fiber spinning (step 16) of the present invention. By contrast, the traditional composites are reinforced by blending expensive fiber such as glass fiber, not derived from the waste source materials, in an additional step.

Figure 2:
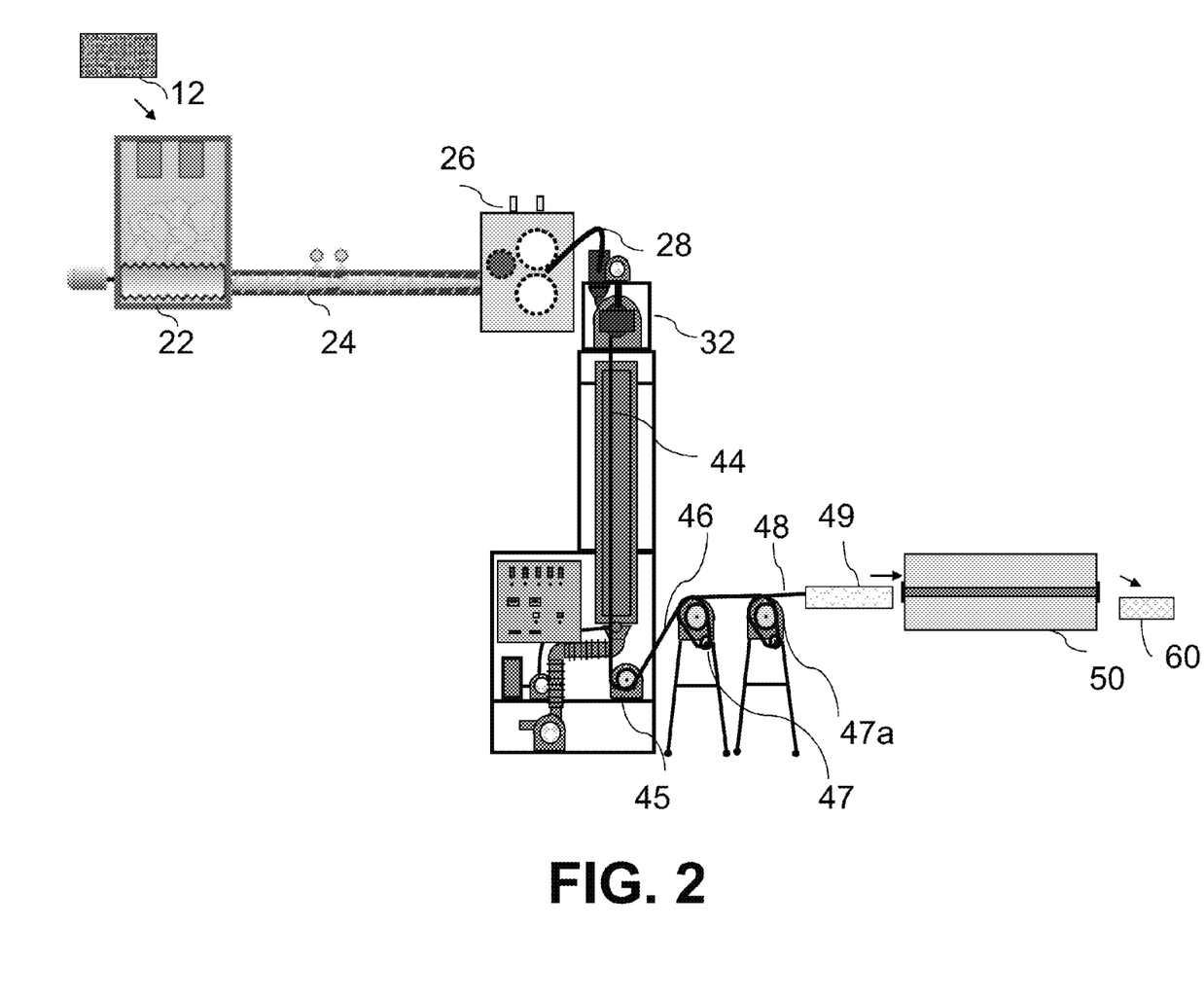
FIG. 2 is a schematic diagram illustrating an exemplary method of manufacturing a recycled self-reinforced composite in accordance with one aspect of the prevent invention.

In an illustrated arrangement, the method and apparatus of making recycled SRC in accordance with one aspect of the present invention is shown in FIG. 2. The input recycled thermoplastic material 12 used in the present invention can be obtained from many sources. A typical recycled thermoplastics source comprises thermoplastic polymers including polypropylene, nylon 6, nylon 6,6, nylon-based copolymers, polyethylene terephthalate (PET), polyvinylchloride, ethylene vinyl acetate (EVA), polyethylene, ABS, polystyrene, polycarbonate, acrylic, and derivates thereof; thermoset polymers including polyurethane (PUR), styrene-butylene rubber (SBR); and additives including fillers, flame retardants, and processing aids.

An illustrated source of this present invention is carpet waste, due to its abundance. A conventional sample of carpet consists of 55 wt. % face fiber, 10 wt. % PP backing fabrics, and 35 wt. % latex. The latex usually is a binder of a calcium carbonate filled styrene-butadiene rubber (SBR). The face fibers are primarily made of one of the polymers, nylon 6,6, nylon 6, PP, or PET. Table 1 shows weight percentage breakdown for the recycled carpet waste diverted from landfill in the US by its face fiber type. (CARE, 2006).

TABLE 1

| Nylon 6,6 | Nylon 6 | PP | PET | Other |
|---|---|---|---|---|
| 34 wt. % | 27 wt. % | 22 wt. % | 2 wt. % | 15 wt. % |

An alternative source of the carpet waste may come from waste collection centers and recycled carpet processing plants. This carpet waste is usually pretreated by a mechanical separation process to remove the unmelted portion of the waste such as thermoset polymers and fillers. The output of the pretreatment process is usually in a form of pellet, powder, or flake. This process can remove a significant amount of latex binder, calcium carbonate filler and dirt. The output of the pretreatment process usually contains more than 85% of the immiscible thermoplastic polymers including PP and nylon (nylon 6 or nylon 6,6). For the three most common face fiber type carpets available in the market, the composition (by weight) of a particular source is shown in Table 2. The reminder is mainly composed of latex binder, calcium carbonate, and dirt.

TABLE 2

|  | PP | Nylon 6 | Nylon 6,6 | Reminder |
| --- | --- | --- | --- | --- |
| PP recycled carpet | 84% | 9% | 0% | 7% |
| Nylon 6 recycled carpet | 11% | 77% | 0% | 12% |
| Nylon 6,6 recycled carpet | 8% | 0% | 81% | 11% |

Another illustrative source of the present invention is waste from the automotive plastic components. For example, a car bumper is commonly made of a primary structure (e.g. nylon) and a secondary impact absorbing material (e.g. PP foams). The soft touching material used in seating and roofing typically comprises a polycarbonate film coated with a soft polyurethane layer and backed by a polyurethane (PUR) foam. An illustrative example of polymer breakdown by weight percentage for a particular passenger car is shown in Table 3. Since PUR is a thermoset polymer, the majority of the automotive thermoplastic waste also comprises a mixture of immiscible polymers of PP and nylon.

TABLE 3

| PP | Nylon | PUR | ABS | Others |
| --- | --- | --- | --- | --- |
| 33% | 14% | 14% | 7% | 32% |

In one particular aspect of the present invention, a suitable recycled thermoplastic polymers source 12 comprises at least one pair of immiscible polymers consisting of a first polymer and a second polymer. The first recycled thermoplastic polymer is selected from the group consisting of nylon 6, nylon 6,6, nylon 6,10, PET, polyurethane, polycarbonates, and derivates thereof. The second recycled thermoplastic polymer is selected from the group consisting of polypropylene, polyethylene, polyolefin, and derivatives thereof. Some examples of the polymer derivatives may include copolymers of polyolefin, such as ethylene/propylene (diene) copolymers (EP(D)M), ethylene/ethylacrylate copolymers (EEA), ethylene/vinyl acetate copolymers (EVA), and ethylene/methylacrylate copolymers (EMA). The first recycled polymer is preferred to have a higher melting temperature than that of the second recycled thermoplastic polymer. For example, PP and nylon 6 is a pair of immiscible polymer and nylon 6 has a higher melting temperature than that of PP.

As shown in FIG. 2, the source materials 12 can be fed into a standard cutter and shredder 22 to reduce the size of the source materials 12 by various motions of cutting and shredding. An illustrative example of this cutter and shredder is available from Next Generation Recyclingmaschinen GmbH (NGR), a business having distributor offices in Norcross, G.A. and offices in Austria. Following the cutting and shredding the fibrous feedstock can be blown into an extruder 24. In one particular arrangement of this present invention, the extruder 24 is a single-screw extruder with good vented capability. An illustrative example of this extruder is also available from the above mentioned NGR GmbH (NGR A-Class Type 55 VSP system). Alternatively, a high-shear mixer, a twin-screw extruder, a compounder, or any other mixing equipment ensuring proper mixing and melting can be used to carry out this function.

The extrudate of vented extruder 24 can then be filtered by a melt filter 26. The melt filter 26 is employed to remove any large unmelted particulates and chunks such as dirt, fillers including calcium carbonate, flame retardants including alumina hydroxides, and thermoset materials including SBR. In one particular aspect of the present invention, the filter can be chosen to be capable of filtering out any particulate greater than about 40 microns. In another particular aspect of the present invention, the filter can be chosen to be capable of filtering out any particulate greater than about 20 microns. In a further particular aspect of the present invention, the filter can be chosen to be capable of filtering out any particulate greater than about 10 microns. The means provides a smooth polymer stream to prevent any breakage in the subsequent fiber spinning process. The filtered extrudate 28 can be presented, preferably in a form of pellet, powder, or flake by cooling and chopping the extrudate 28, or in a form of a continuous strip to be fed directly into the next step.

The filtered extrudate 28 can then be fed into a fiber spinning line 32, wherein the filtered extrudate 28 is converted into one or more individual strands or filaments of substantially continuous fiber through a spinneret with a proper fiber forming mechanism. An example of a suitable spinning line 32 and its mechanism are available from Alex James & Associates, Inc, a business having offices in Greenville, S.C.

Figure 3:
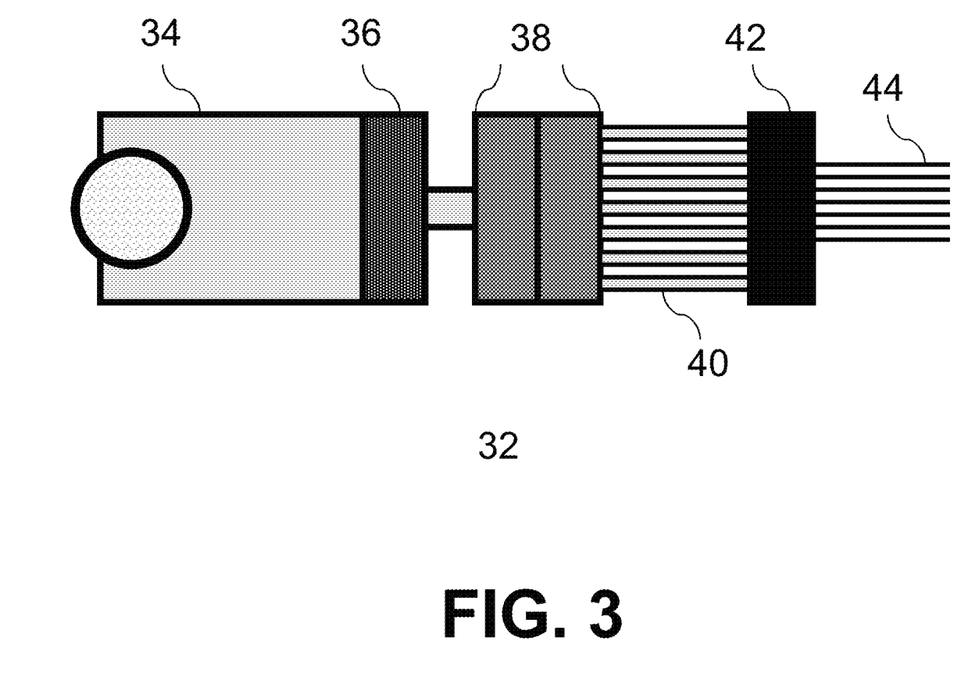
FIG. 3 is a schematic diagram illustrating an exemplary method of phase-migration fiber spinning using the spinning line 32.

In one specific aspect of the embodiment, the fiber spinning line 32 provides a stretching of substantially multicomponent polymer filaments or precursor fibers 44, preferably composed of a core polymer having a higher melting temperature than that of the sheath polymer. A particular aspect of the technique of the invention can provide for a formation-extrusion the extrudate 28 to form a substantially continuous fiber wherein a first polymer substantially exposed on the surface while the second polymer is substantially surrounded by the first polymer. The above process is defined as the phase-migration fiber spinning process in the present invention. A more detailed illustration of the setup for the fiber spinning line 32 is shown in FIG. 3. Preferably, the first polymer has a lower melting temperature than that of the second polymer. It is preferable that the difference of the melting temperatures between the first and second polymer can be at least about 10° C. apart, at least about 20° C. apart, or even at least about 30° C. apart. The lower melting temperature polymer on the surface can function as a binder material to form a matrix in the subsequent thermoforming step 18. The high melting temperature polymer in the form of fiber provides reinforcement for the SRC 60. For example, suitable thermoplastic polymers to form the matrix can be selected at least from one of the group consisting of polypropylene, polyethylene, polyolefin, and derivatives thereof. Suitable thermoplastic polymers to form the reinforcement fiber can be selected from at least one of the group consisting of nylon 6, nylon 6,6, nylon 6,10, PET, polycarbonates, polyurethane, and their derivatives.

Phase-Migration Fiber Spinning

An immiscible polymer blend (or immiscible polymers) comprises two or more polymers which are mutually incapable of mixing homogeneously at the molecular level. For example, Nylon and PP are immiscible due to their difference in polarity. These immiscible polymer blends undergo phase separation in a molten state, usually resulting in a very poor mechanical property. Depending on the composition ratio, the phase-separated polymer melt evolves into various different morphologies in order to minimize their interfacial energy. For example, a typical phase-separated polymer blend of nylon and PP consists of an interlocking nylon-rich phase and a PP-rich phase.

In the present invention, phase migration refers to a state where the phase-separated immiscible polymer melt migrates and settles into two separated layers. An analogy for this phenomenon is like mixing a small amount of oil in a cup of water and agitating the mixture vigorously. A plurality of oil droplets are surrounded by the water. Theoretically, it will take a long time to allow the water and oil to separate into two individual layers, an equilibrium state. This is especially difficult for a pair of highly viscous polymers to reach the equilibrium state before they solidify.

In one particular aspect of the present invention, the phase-migration fiber spinning occurs under an inhomogeneous flow field such as capillary or tubular flow. The less viscous polymer melt of the immiscible polymers tends to move into the high-shear region thus displacing the more viscous polymer melt. Although a variety of variables can affect the migration, the effect is often attributed to the "laziness of nature" or the "principle of energy minimization". For a highly viscous melt flowing through a capillary tube, the high shear rate area is adjacent to the wall of the tube and the low shear rate area is at the centre of the tube. Therefore, in a particular aspect of the present invention, the lower viscosity component such as PP tends to migrate towards the wall. In general, phase migration increases with increasing viscosity ratios, apparent shear rates, and length/diameter (L/D) ratios in fiber spinning.

In a particular aspect of this invention, the preferred morphology of the resulting fiber has a sheath-and-core structure, with the lower-melting temperature polymer as the sheath, as shown in FIG. 4A. Another preferred partially equilibrium structure is island-in-a-sea structure, with lower-melting polymer as the sea, as shown in FIG. 4B. In real-time polymer processing, the actual structure can be affected not only by the viscosity ratio, but also by the apparent shear rate and tube length.

In another particular aspect of this invention, the polymer forming the matrix has a lower viscosity than that of the polymer forming the reinforced fiber at the predetermined temperature and shear rate. In an illustrative example for this present invention, a suitable PP in the present invention, at an apparent shear rate of 5,000 s$^{-1}$, has a shear viscosity of 14 Pa-s (Pascal-second) at 230° C. At the same apparent shear rate, a suitable Nylon 6 in the present invention, has an apparent shear viscosity of 100 Pa-s at 230° C. In another illustrative example for this present invention, a suitable PP in the present invention, at an apparent shear rate of 100 s$^{-1}$, has a shear viscosity of 80 Pa-s (Pascal-second) at 230° C. At the same apparent shear rate, a suitable Nylon 6 in the present invention, has an apparent shear viscosity of 700 Pa-s at 230° C. The apparent shear viscosity measurement was carried out by a standard capillary viscometer made by Dynasco Model LR-7001.

At a predetermined temperature and shear rate based on the fiber spinning condition, phase-migration viscosity ratio is defined as the apparent viscosity ratio between the core polymer (the first thermoplastic polymer), V (core) and the shear polymer (the second thermoplastic polymer), V (shear). In one particular aspect of the invention, the phase-migration viscosity ratio is greater than about 1.5. In another particular aspect of the invention, the phase migration viscosity ratio is greater than about 3. In one further particular aspect of the invention, the phase migration viscosity ratio is greater than about 5.

Figures 4, 5:
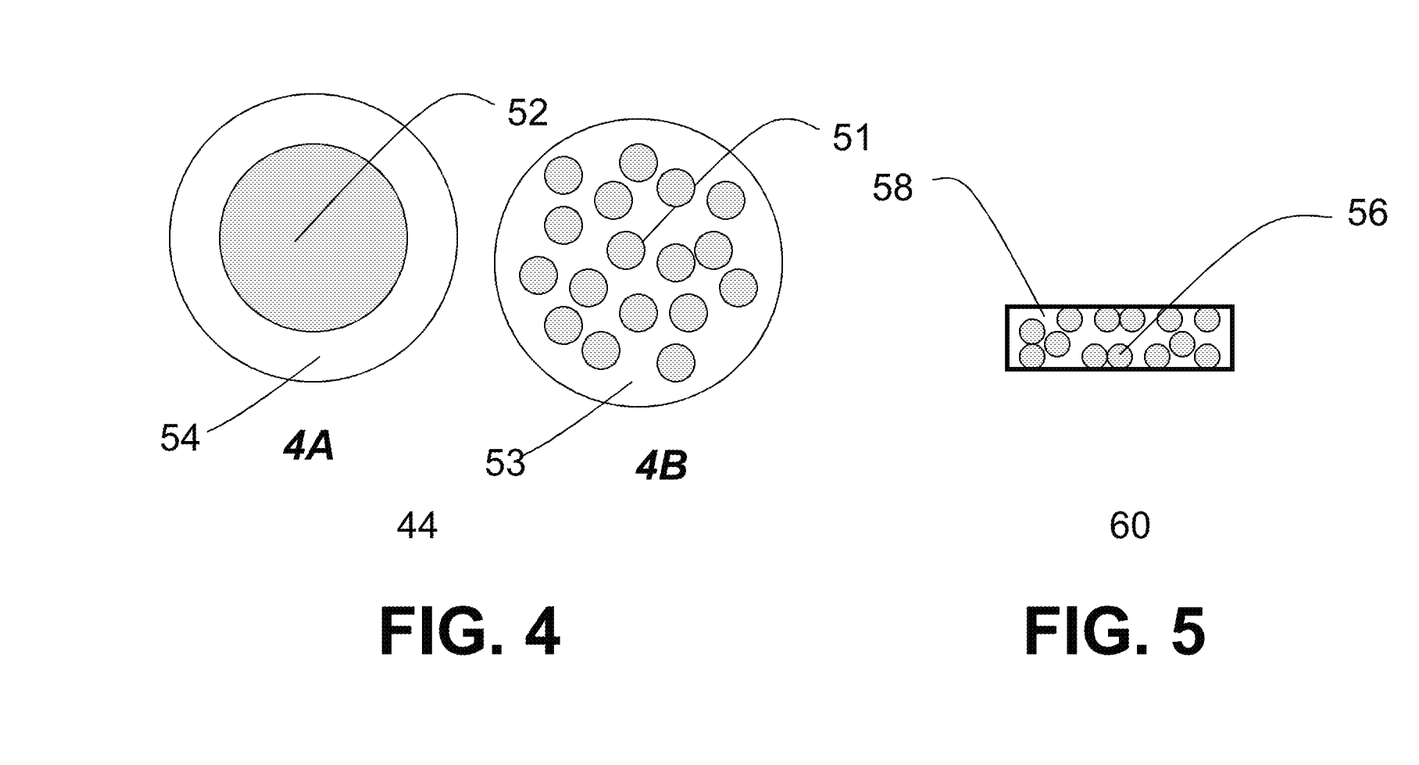
FIG. 4 is a cross-sectional side view of an exemplary individual fiber of the fiber 44 as a result of the phase-migration fiber spinning of the present invention.
FIG. 5 is a cross-sectional side view of an exemplary thermoforming article 60 of the present invention.

In the illustrated arrangement, the method and apparatus for making the phase-migration precursor fibers 44 with the preferred morphology (as shown in FIG. 4) is shown in FIG. 3. As shown in FIG. 3, an example of a suitable spinning line 32 includes an extruder 34, a melt-filer 36, a gear pump 38, a spinneret (or an extended capillary spinning die) 40 and a die plate 42. This fiber forming step not only strengthens the blend but also refines the phase domain size because of the large reduction in filament cross-section during fiber spinning. The reduction in phase domain size due to the fiber formation also helps to minimize the incompatibility between the immiscible polymers to some extent. As shown in FIG. 3, the extrudate 28 can be fed into an extruder 34. An example of a suitable extruder is a twin-screw extruder with a screw diameter of 19 mm each, and a length/diameter (L/D) ratio of about 24/1. Such an extruder is available from the above-mentioned Alex James & Associates, Inc. The extruder 34 can be a single-screw extruder or a twin-screw extruder. In one particular aspect of this arrangement, a twin-screw can be used because compounding and extrusion can be combined in this setup rather than a single-screw extruder as commonly used in profile and filament extrusion. This combinatory step not only reduces switch-over time but also ensures the polymer blend can be timely delivered to the extrusion die in order to reduce annealing related phase coarsening.

The melt-filter 36 can be used to further remove any particulate may potentially agglomerate and block the spinning orifice to cause fiber breakage. In one particular aspect of the present invention, the filter can be chosen to be capable of filtering out any particulate greater than about 20 microns. In another particular aspect of the present invention, the filter can be chosen to be capable of filtering out any particulate greater than about 10 microns. In a further particular aspect of the present invention, the filter can be chosen to be capable of filtering out any particulate greater than about 5 microns. Alternatively, the extruder 34 can include a conventional, on-line static mixer. Suitable static mixers are available from Koch Engineering Company, Inc., a business having offices located in Wichita, Kans. The filtered extrudate can be fed into a gear pump or gear pumps. Another preferred aspect of the manufacturing setup is on the use of gear pumps 38. In conventional fiber spinning, gear pumps 38 are used mostly for achieving uniform pressure and thus a stable process, while in the present setup they are mainly used for increasing the extrusion pressure. The pressure delivered by a twin-screw extruder 34 is typically lower than a single-screw extruder. Further, extrusion of a viscous polymeric melt through a long capillary requires high pressure.

Another preferred aspect of the manufacturing setup is the addition of a spinneret 40 which comprises one or more extended capillary tube(s) with one end(s) being the spinning orifice(s). The spinneret 40 can be assembled, integrated, or fixed into a die plate 42 in various configurations for easy operation. For example, the spinneret 40 and the die plate 42 can be integrated as one-piece unit or the spinneret 40 can be designed as an insert to be screwed into the die plate 42. One or more individual capillary tube(s) can be employed for the above mentioned configuration. It is surprising to have found that the flow in long capillaries helps PP to migrate to the surface of the extrudate.

The applicant has unexpectedly discovered that the method and apparatus described in FIG. 3 lead to the preferred phase-migration fiber spinning mode. This method and setup enables phase-migration morphology with a low melting polymer such as polypropylene drifting to the surface and the high melting temperature polymer such as nylon drifting towards the center of the spun precursor fiber 44.

In one particular aspect of the present invention, the spinneret 40 comprises one or more capillary tubes having a length to diameter (L/D) ratio greater than about 20 to 1 (L/D=20). Alternatively, the spinneret 40 comprises one or more capillary tubes having an L/D ratio greater than about 50 to 1. In another aspect of the invention, the spinneret 40 comprises one or more capillary tubes having an L/D ratio greater than about 150 to 1. For a larger L/D ratio (a smaller orifice and a longer capillary tube), the immiscible melt experiences a higher shear rate and a longer residence time, facilitating the formation of phase migration. However, the system requires a high pressure for fiber spinning if the L/D ratio becomes too large.

In one specific embodiment of the present invention, the precursor fiber 44 contains fibers with a sheath-core cross-section as shown as in FIG. 4A, where sheath polymer 54 comprises mainly the low melting temperature polymer such as polypropylene and the core polymer 52 comprises mainly the high melting temperature polymer, such as nylon 6 or nylon 6,6.

In another specific embodiment of the present invention, the precursor fiber 44 contains fibers with an islands-in-a-sea cross-section as shown as in FIG. 4B where sea polymer (equivalent to sheath polymer) 53 comprises mainly the low melting temperature polymer such as polypropylene and the core polymer (equivalent to island polymer) 51 comprises mainly the high melting temperature polymer such as nylon 6 or nylon 6,6.

The resulting precursor fiber 44 in a form of one or multifilament strands can then be drawn and elongated by a drawn-down roll 45 during the cooling and quenching. The drawn-down roll 45 can also be configured to be a quench roll to provide further cooling and solidification of the precursor fiber strands. A conventional driving system, such as provided by an electric motor or the like, operatively rotates the drawn-down roll to provide a selected peripheral surface speed at the outer cylindrical surface of the rotating draw-down roll. Concurrently, the fiber strands are being move out of the spinneret 40 of the spinning line 32 at an operative fiber forming speed. The fiber forming speed is configured to be less than the surface speed of the drawn-down roll 45, and as a result, the fiber strands are subjected to a tensioning and elongation. The quotient of the draw-down roll surface speed divided by the fiber forming speed can be referred to as the draw-down ratio provided by the draw-down process. In general, the draw-down ratio helps to control the strength of the nascent fiber or precursor fiber. A higher draw-down ratio can increase the stress-induced crystallization within the fiber, and thereby increase the fiber strength. Particular aspects of the invention can provide for a draw-down ratio which is not less than about 3. Alternatively, the draw-down ratio is not less than about 5, and optionally, is not less than about 10.

The resulting fiber 46 can be delivered to an elongating mechanism for stretching the fiber. For example, the elongating mechanism can be provided by a system of draw rolls which includes draw rolls 47 and 47a. The draw rolls 47 and 47a can be a heated roller for imparting a desired drawing temperature to the fiber strands. In addition, a conventional driving system, such as provided by an electric motor or the like, operatively rotates each of the draw rolls to provide a selected, peripheral surface speed at the outer cylindrical surface of each rotating draw roll. The surface speed provided on the roll 47, however, is arranged to be less than the surface speed provided on the draw roll 47a. As a result, the fiber strands are subjected to a tensioning and elongation. The quotient of the surface speed at the relatively downstream draw roll 47a divided by the surface speed at the relatively upstream draw roll 47 can be referred to as the "draw ratio" imparted to the stretching operation generated by the representative, cooperating system of rolls 47 and 47a. In a particular aspect of the invention, the draw or stretching system provided by rolls 47 and 47a can be constructed and arranged in a conventional manner to generate a draw ration for the stretching operation which is not less than about 1. Alternatively, the draw ratio can be not less than about 1.2. In other aspects, the incremental-stretching draw ratio can be not more than about 30. Alternatively the draw ratio can be not more than about 20.

The resultant elongation mechanism provides for a stretching of the strands of fiber 46, to further increase the fiber stiffness and toughness. The stretching can also be conducted in an ambient atmosphere. It is well known that the strength and modulus of a solid polymer depends on the level of molecular orientation. Highly oriented polymers could have strength higher than that of steel. Alternatively, the resulting fiber 46 can be drawn at elevated temperature to facilitate the fiber orientation under stress.

In one particular aspect of the present invention, an illustrative stretched fiber 48 has a Young's modulus at least greater than 500 MPa (Mega Pascal). In another particular aspect of the present invention, an illustrative stretched fiber 48 has a Young's modulus at least greater than 700 MPa. In a further particular aspect of the present invention, an illustrative stretched fiber 48 has a Young's modulus at least greater than 1,000 MPa.

In one particular aspect of the present invention, an illustrative stretched fiber 48 has a tensile strength at break at least greater than 100 MPa (Mega Pascal). In another particular aspect of the present invention, an illustrative stretched fiber 48 has a tensile strength at break at least greater than about 150 MPa. In a further particular aspect of the present invention, an illustrative stretched fiber 48 has a tensile strength at break at least greater than about 200 MPa.

The stretched fiber 48 can then be laid flat in a form of a fiber mat 49. The fiber mat can be arranged in an oriented manner or can be woven into a regular pattern to further increase the reinforcement. Alternatively, the fiber mat can be simply arranged in a random order to form a mat such as the conventional arrangement in a nonwoven fabric. The fiber mat 49 can then be processed by a thermoformer 50 into a shaped composite article 60 depending on the applications. An example of a suitable thermoforming apparatus 50 is a compression molder. An example of a suitable compression molder is available from Carver, Inc. (30-Ton Monarch Hydraulic Press), a business having offices in Wabash, I.N. The thermoformer 50 should be operated at temperatures above the melting temperature of the sheath polymer and below the melting temperature of the core polymer to realize the improved mechanical performance benefit of the self-reinforced composites. FIG. 5 illustrates a preferred cross-sectional view of the shaped composite articles or SRC 60 wherein the high modulus fiber 56 is surrounded by the low melting temperature polymer matrix 58. Parts made of the blend prepared using this method is highly self-reinforced by the fibrils of the high-melting-point polymer, resulting in enhanced performance or even better mechanical properties than the virgin polymers due to the synergistic effect.

In one particular aspect of the present invention, the fiber mat 49 can be pre-molded in a sheet form at a temperature slightly above the melting temperature of the polypropylene for the subsequent thermoforming processes to produce shaped final articles. Alternatively, the stretched fiber 48 or the fiber mat 49 can be chopped into short-cut fibers or pellets for alternatively subsequent injection molding process. In another particular aspect of present invention, the stretched fiber 48, after stretching with the draw rollers set 47 and 47a, can be collected in a bobbin for other fiber spinning applications including converting the stretched fiber 48 back into a carpet.

Example 1

Nylon 6 (ULT B27 purchased from BASF) was blended with polypropylene (HGZ1200 from Philip-Sumika Corporation) in a 70:30 by volume ratio. The nylon 6 resin has a viscosity number of 150 ml/g (under ISO 307). The polypropylene has a melt flow rate of 115 g/10 min at 230° C. (under ASTM D1238). The nylon 6 resin was dried under vacuum for 24 hours at 80° C. to ensure complete removal of moisture. The immiscible blend was prepared by mixing in a Brabender Roller Blade Mixer at 60 rpm, 230° C., under nitrogen flow. The resulting mixture in the form of flake was then extruded by a customized fiber extrusion setup assembled at Georgia Institute of Technology similar to the description in FIG. 3. The extrusion die has a (length/diameter) L/D ratio of 200 (101.6 mm/0.508 mm). The temperature of the fiber extrusion setup is 230° C. at the feeding zone and is 240° C. at the spinneret. The melt filament was cold-drawn 4 times down to a diameter about 200 microns. The mechanical properties of the resulting fibers were then examined by a tensile tester at a displacement speed of 0.05 mm/s (Instron universal tensile testing machine). The Young's modulus of the fiber was found to be 1,050 MPa and the tensile strength at break is 200 MPa. The resulting fiber was then embedded in epoxy matrix, cut into thin slices and then treated with formic acid to dissolve nylon 6. The cross section of the fiber was then observed by a scanning electron microscope. The sheath-and-core morphology was observed, as evidenced by a hollow fiber of remnants PP. It is demonstrated that PP has completely encapsulated the nylon 6. The skin made of PP has a nice continuous structure.

Example 2

A swirl of the fiber prepared in Example 1 was randomly laid and compressed between two heated platens on a Carver hydraulic press (30-Ton Monarch Hydraulic Press) at 200° C., about 30° C. above the melting temperature of PP. As a result, the PP completely melted to form a matrix reinforced with the remaining continuous nylon 6 fiber. The resulting molded sheet was 2 cm thick. The resulting composite sheet is flexible and tough, as compared with a typical glass fiber-filled composite sheet, which is much more brittle. Examination of the broken surface of the tensile sample indicated a fibrous failure mode resulting from the breakage of long nylon fibrils, as evidenced for the reinforced effect of the composites by the nylon 6 fiber. The non-optimal composite self-reinforced with the randomly laid fiber has a Young's modulus of 1,500 MPa and a tensile strength at break of 21 MPa.

Example 3

Nylon 6 (ULT B27 purchased from BASF) was blended with polypropylene (HGZ1200 from Philip-Sumika Corporation) in a 70:30 by volume ratio. The nylon 6 resin has a viscosity number of 150 ml/g (under ISO 307). The polypropylene has a melt flow rate of 115 g/10 min at 230° C. (under ASTM D1238). The nylon 6 resin was dried under vacuum for 24 hours at 80° C. to ensure complete removal of moisture. The immiscible blend was prepared by mixing in a Brabender Roller Blade Mixer at 60 rpm, 230° C., under nitrogen flow. The resulting mixture in the form of flake was then extruded by a customized fiber extrusion setup assembled at Georgia Institute of Technology similar to the description in FIG. 3. The spinneret has a capillary tube having a (length/diameter) L/D ratio of 25 (12.7 mm/0.508 mm). The temperature of the fiber extrusion set up is 230° C. at the feeding zone and is 240° C. at the spinneret. The melt filament was cold-drawn 4 times down to a diameter about 200 microns. The mechanical properties of the resulting fibers were then examined by a tensile tester at a displacement speed of 0.05 mm/s (Instron universal tensile testing machine). The Young's modulus of the fiber was found to be 950 MPa and the tensile strength at break is 175 MPa. The resulting fiber was then embedded in epoxy matrix, cut into thin slices and then treated with formic acid to dissolve nylon 6. The cross section of the fiber was then observed by a scanning electron microscope. A partial (about 80%) sheath-core morphology was observed, as evidenced by a hollow fiber of remnants PP. However, the development of the sheath-and-core morphology is not as complete as demonstrated in Example 1. It indicates the process of PP migration towards skin has started, but complete encapsulation is yet to occur.

Comparative Example 1

Low L/D Ratio

Nylon 6 (ULT B27 purchased from BASF) was blended with polypropylene (HGZ1200 from Philip-Sumika Corporation) in a 70:30 by volume ratio. The nylon 6 resin has a viscosity number of 150 ml/g (under ISO 307). The polypropylene has a melt flow rate of 115 g/10 min at 230° C. (under ASTM D1238). The nylon 6 resin was dried under vacuum for 24 hours at 80° C. to ensure complete removal of moisture. The immiscible blend was prepared by mixing in a Brabender Roller Blade Mixer at 60 rpm, 230° C., under nitrogen flow. The resulting mixture in the form of flake was then extruded by a customized fiber extrusion setup assembled at Georgia Institute of Technology similar to the description in FIG. 3. The spinneret is a die having a conventional (length/diameter) L/D ratio of 2 (1.016 mm/0.508 mm), commonly used in the industry. The temperature of the fiber extrusion set up is 230° C. at the feeding zone and is 240° C. at the spinneret. The melt filament was cold-drawn down 4 times to a diameter about 200 microns. The mechanical properties of the resulting fibers were then examined by a tensile tester at a displacement speed of 0.05 mm/s (Instron universal tensile testing machine). The Young's modulus of the fiber was found to be 450 MPa and the tensile strength at break is 15 MPa. The resulting fiber was then embedded in epoxy matrix, cut into thin slices and then treated with formic acid to dissolve nylon 6. The cross section of the fiber was then observed by a scanning electron microscope. No sheath-and-core morphology was observed, as evidenced by co-existent morphology.

Comparative Example 2

Low L/D Ratio

A swirl of the fiber prepared in Comparative Example 1 was randomly laid and compressed between two heated platens on a Carver hydraulic press (30-Ton Monarch Hydraulic Press) at 200° C., about 30° C. above the melting temperature of PP. As a result, the PP was completely melted to form a matrix reinforced with the remaining continuous nylon 6 fiber. The resulting molded sheet was 2 cm thick. The resulting composite sheet has very poor adhesion and is weak and fragile, as compared with that in the Example 2. Examination of the broken surface of the tensile sample indicated a matrix failure mode resulting from the breakage of PP film. The comparative composite has a Young's modulus of 344 MPa and a tensile strength at break of 15 MPa.

Example 5

Shredded whole nylon carpet scrap having a composition of about 56% nylon 6, about 16% polypropylene, and about 28% SBR with calcium carbonate by weight was diverted from landfill. The shredded carpet was converted into pellets using a NGR A-Class type 55 VSP Repelletizing system (available from Next Generation Recyclingmaschinen). The setup is equipped with a shredder incorporated in the feed section of the extruder 24 as shown in FIG. 2. The feed has crammers to force the bulky carpet feedstock into the in-line shredder. Following shredding the fibrous feedstock is blown into the extruder barrel 24. The down stream sections of the extruder are set at 265° C. The melt is vented, filtered using a 20 mesh screen where the SBR and fillers were substantially removed from the melt. The filtered extrudate as strands was air-cooled and then fed into a twin-screw extruder with a screw diameter of 19 mm, and a screw length/diameter (L/D) ratio of 24/1/(available from Alex James & Associates, Inc.), similar to the description in FIG. 3. The spinneret or extrusion die has a capillary tube with a (length/diameter) L/D ratio of 200/1 (101.6 mm/0.508 mm) as illustrated in 40 in FIG. 3. The temperature of the fiber extrusion set up is 230° C. at the feeding zone and is 240° C. at the spinneret 40. The melt filament was subjected to a draw-down ratio of 20. The fiber was then stretched by cold-drawn 4 times down to a diameter about 200 microns. The mechanical properties of the resulting fibers were then examined by a tensile tester at a displacement speed of 0.05 mm/s (Instron universal tensile testing machine). The modulus of the fiber was found to be 1,080 MPa and the tensile strength at break is 185 MPa. The resulting fiber was then embedded in an epoxy matrix, cut into thin slices and then treated with formic acid to dissolve nylon 6. The cross section of the fiber was then observed by a scanning electron microscope. The sheath-core morphology was observed, as evidenced by a hollow fiber of remnants PP. It is demonstrated that PP has completely encapsulated the nylon. The skin made of PP has a nice continuous structure.

As can be seen from the above, the present invention provides a novel recycling route to enhance the mechanical properties of immiscible polymers. The elimination of the complicated sorting and separation steps in recycling these two polymers implies less energy and crude oil consumption for making virgin polymers. In addition to possessing superior mechanical strength, the lightness of the resultant products can enhance fuel efficiency in transportation. The materials can be further prepared by compression molding or extrusion molding process to create three-dimension composites with enhanced mechanical properties. The resulting SRC can be used as parts in markets such as the automotive, marine, building and construction, appliances, and sportswear industries.

Alternatively, virgin polymers can be blended with the extrudate 28 and be fed into extruder 34. The advantage is to maintain a proper ratio between the core (the high melting temperature) polymer and the sheath (the lower melting temperature) polymer to compensate possible composition variations from the various waste streams. A suitable weight ratio between the core polymer and the sheath polymer can be in the range of from about 80/20 to about 20/80. If the weight ratio between the core polymer and the sheath polymer is too high, the resulting SRC may not have enough bonding force to form a matrix in the subsequent thermoforming process. If the weight ratio between the core polymer and the sheath is too low, the resulting SRC may not have enough fiber strength to provide reinforcement in the subsequent thermoforming process. The other materials include compatibilizers, adhesion promoters processing aids, antioxidant, UV stabilizer, and pigment can be fed into extruder 34. Some examples of such a compatilizer including maleic anhydride grafted polypropylene can be used to further strengthen the interfacial adhesion between nylon and polypropylene if necessary.

Alternatively, the fiber spinning line 32 could be a bicomponent fiber spinning line equipped with a core side feeding extruder and sheath side feeding extruder. The core side extruder is preferred to have the basic components as shown in FIG. 3 including an extruder 34, a melt filter 36, a gear pump 38, and a spinneret 40. The outlets of these two extruders are then integrated into a sheath-core die typically for bicomponent fiber spinning. In an illustrative example of this present invention, the extrudate 28 can be fed directly into the core side extruder of the bicomponent fiber spinning line 32. Recycled or virgin PP can be fed into the sheath side extruder of the bicomponent fiber spinning line 32.

Alternatively, the fiber spinning line 32 could be a melt-blown or spunbond fiber spinning line equipped with the major components taught in FIG. 3. In the specific arrangement of the present invention, the extrudate 28 can be spun into a continuous non-oriented fiber mat for the subsequent thermoforming process.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

What is claimed is:

1. A self-reinforced composite, comprising:
   (a) a high modulus fiber comprising a first recycled thermoplastic polymer and a second recycled thermoplastic polymer, wherein the first recycled thermoplastic polymer is surrounded by the second recycled thermoplastic polymer using the phase-migration fiber spinning process, and wherein the high modulus fiber resulted from the phase-migration fiber spinning process having a Young's modulus greater than 500 MPa, and
   (b) a matrix, wherein the matrix results substantially from melting the second recycled thermoplastic polymer, wherein the weight ratio between the high modulus fiber and said matrix is between about 80/20 to about 20/80.

2. The self-reinforced composite of claim 1 wherein the first recycled thermoplastic polymer and the second recycled thermoplastic polymer are obtained from a carpet waste stream.

3. The self-reinforced composite of claim 1 wherein the first recycled thermoplastic polymer and the second recycled thermoplastic polymer are obtained from an automotive waste stream.

4. The self-reinforced composite of claim 1 wherein the first recycled thermoplastic polymer has a melting temperature at least 20° C. higher than that of the second recycled thermoplastic polymer.

5. The self-reinforced composite of claim 1 wherein the first recycled thermoplastic polymer is selected from the group consisting of nylon 6, nylon 6,6, nylon 6,10, PET, polycarbonates, polyurethane, and derivatives thereof.

6. The self-reinforced composite of claim 1 wherein the second recycled thermoplastic polymer is selected from the group consisting of polypropylene, polyethylene, polyolefin, and derivates thereof.

7. The self-reinforced composite of claim 1 wherein the high modulus fiber has a tensile strength at break greater than 150 MPa.

8. The self-reinforced composite of claim 1 wherein the first recycled thermoplastic polymer has a higher viscosity than that of the second recycled thermoplastic polymer at a processing temperature above the melting temperature of the first recycled thermoplastic polymer.

9. The self-reinforced composite of claim 1 wherein the first recycled thermoplastic polymer has an apparent shear viscosity greater than 1.5 times of that of the second recycled thermoplastic polymer, at a processing temperature above the melting temperature of said first recycled thermoplastic polymer.

10. The self-reinforced composite of claim 1 wherein the first recycled thermoplastic polymer has an apparent shear viscosity greater than 3 times of that of the second recycled thermoplastic polymer, at a processing temperature above the melting temperature of the first recycled thermoplastic polymer.

11. The self-reinforced composite of claim 1 wherein the matrix results substantially from melting the second recycled thermoplastic polymer of the high modulus fiber at a temperature below the melting temperature of the first recycled thermoplastic polymer.

12. The self-reinforced composite of claim 1 wherein the high modulus fiber results substantially from drawing the fiber using a draw-down ratio not less than 3 and a draw ratio not less than 1.2 after the phase-migration fiber spinning process.

13. The self-reinforced composite of claim 1 wherein the high modulus fiber is surrounded by the matrix.

14. The self-reinforced composite of claim 1 wherein the high modulus fiber is continuous fiber randomly orientated in the matrix.

15. The self-reinforced composite of claim 1 wherein the high modulus fiber is short cut fiber oriented in the matrix.

16. The self-reinforced composite of claim 1 wherein the high modulus fiber is woven in a regular pattern in the matrix.

17. The self-reinforced composite of claim 1 wherein the first recycled thermoplastic polymer is selected from the group consisting of nylon 6, nylon 6,6, nylon 6,10, PET, polycarbonates, polyurethane, polystyrene, and derivatives thereof.

* * * * *